United States Patent [19]

Koerner et al.

[11] 4,306,050
[45] Dec. 15, 1981

[54] PROCESS FOR THE MANUFACTURE OF ORGANOPOLYSILOXANES FOR USE IN ABHESIVE COATING MATERIALS

[75] Inventors: Götz Koerner; Václav Kropac; Christian Weitemeyer, all of Essen, Fed. Rep. of Germany

[73] Assignee: Th. Goldschmidt AG, Essen, Fed. Rep. of Germany

[21] Appl. No.: 116,762

[22] Filed: Jan. 30, 1980

[30] Foreign Application Priority Data

Feb. 2, 1979 [GB] United Kingdom ............... 03659/79

[51] Int. Cl.$^3$ ............................................. C08G 77/04
[52] U.S. Cl. ................................. 528/26; 204/159.13; 428/447; 528/21; 528/38; 556/437; 556/439; 556/440; 556/441
[58] Field of Search ............................ 528/26, 38, 21; 556/437, 439, 440, 441; 428/447; 204/159.13

[56] References Cited

U.S. PATENT DOCUMENTS 2,584,344 2/1952 Goodwin, Jr. et al. ............... 528/26
2,842,517 7/1958 Shorr .................................. 528/26
3,701,815 10/1972 Matzner et al. ...................... 528/26

FOREIGN PATENT DOCUMENTS 2747233 7/1978 Fed. Rep. of Germany .
1384898 2/1975 United Kingdom .

Primary Examiner—Melvyn I. Marquis
Attorney, Agent, or Firm—Toren, McGeady & Stanger

[57] ABSTRACT

A method for the manufacture of organopolysiloxanes for use in abhesive coating materials wherein organopolysiloxanes having the formula

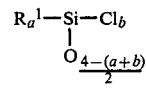

in which
R$^1$ is an alkyl group with 1 to 4 carbon atoms, a vinyl group and/or a phenyl group, with the proviso that at least 90 mole percent of the R$^1$ groups are methyl groups,
a has a value 1.8 to 2.2, and
b has a value of 0.004 to 0.5, are reacted with at least equimolar amounts of pentaerythritol triacrylate or pentaerythritol trimethacrylate and separating the product from the solid components suspended therein. The organopolysiloxanes can be rapidly cured and simultaneously fixed on the carrier.

10 Claims, No Drawings

PROCESS FOR THE MANUFACTURE OF ORGANOPOLYSILOXANES FOR USE IN ABHESIVE COATING MATERIALS

BACKGROUND OF THE INVENTION

1. Field of the Invention

The invention relates to a process for the manufacture of organopolysiloxanes which are suitable as active ingredients of abhesive coating materials for two-dimensional carriers and especially for paper or plastic films. The process involves the reaction of organopolysiloxanes which have SiCl groups with pentaerythritol triacrylate or pentaerythritol trimethacrylate. Optionally, HCl-binding neutralizing agents can be added.

2. Description of the Prior Art

A process is described in German Offenlegungsschrift No. 2,747,233 for the manufacture of organopolysiloxanes which are modified with acrylic esters or methacrylic esters. In this process, methacrylic esters or methacrylic esters having COH groups are reacted with organopolysiloxanes which have SiX groups (X=alkoxyl, hydroxyl or chloro), optionally in the presence of catalysts. This process is characterized by the fact that the organopolysiloxanes are reacted with 0.05 to equimolar amounts, based on the COH and SiX groups, of pentaerythritol triacrylate or pentaerythritol trimethacrylate using conventional procedures.

The compounds prepared according to this German Offenlegungsschrift have the advantage that, after the addition of known initiators, such as, for example, benzophenone or benzoin ethers, they can be cured by UV radiation in a very short time and generally in less than one second. These compounds may, therefore, be used with particular advantage as bonding agents or as bonding agent additives for printing inks, the printing inks being fixed by UV curing on the carrier. At the same time, these cured printing inks are hydrophobic. The products of the process may also be used for coating paper, wood or metal surfaces. For example, it is possible to produce coating materials from these compounds, which endow the paper with a high degree of gloss. However, coating materials with abhesive properties which would permit the use of papers so coated as release papers, cannot be obtained by this process.

SUMMARY OF THE INVENTION

We have discovered a method for making coating compounds which are suitable for the abhesive coating of two-dimensional carriers and especially of paper or plastic films which possess the rapid curing property of the compounds, as described in German Offenlegungsschrift No. 2,747,233 and which results in fixation of the organo-modified siloxanes on the two-dimensional carriers at the same time as they are being cured.

The present process requires a modification of the process of German Offenlegungsschrift No. 2,747,233 and comprises:

(a) using organopolysiloxanes having the formula

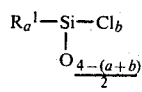

in which $R^1$ is an alkyl group with 1 to 4 carbon atoms, a vinyl group and/or a phenyl group, with the proviso that at least 90 mole percent of the $R^1$ groups are methyl groups, a has a value of 1.8 to 2.2, and b has a value of 0.004 to 0.5;

(b) carrying out the reaction with at least equimolar amounts of pentaerythritol triacrylate or pentaerythritol trimethacrylate; and (c) separating the product of the process from the solid components suspended in the product by conventional methods.

DESCRIPTION OF THE PREFERRED EMBODIMENT

The first characteristic of the inventive process consists of the selection of a special organochlorosiloxane. In this organochlorosiloxane, $R^1$ represents an alkyl group with 1 to 4 carbon atoms, a vinyl group and/or a phenyl group. Methyl or ethyl groups are especially preferred as the alkyl group. Also, at least 90 mole percent of the $R^1$ groups are methyl groups. Within the siloxane therefore, $R^1$ can take various forms. For example, there may be 10 mole percent of phenyl groups along with 90 mole percent of methyl groups in the molecule. However, those chlorosiloxanes wherein $R^1$ is exclusively methyl are preferred.

The degree of branching is indicated by the index a. If a is less than 2, the siloxanes are branched and the branching value increases as the value of a decreases. The use of organochloropolysiloxanes which are linear and have 6 to 50 silicon atoms in the chain is especially preferred. Here again, the $\alpha,\omega$-bis-chloropolydimethyl siloxanes are especially preferred.

The value of b is a measure of the chlorine residues linked to the silicon atom. Since all chlorine residues are replaced by pentaerythritol triacrylate residues or pentaerythritol trimethacrylate residues in the inventive process, the number b at the same time indicates how many of such organic residues are contained in the product obtained by the process.

In German Offenlegungsschrift No. 2,747,233, the reaction takes place between organopolysiloxanes, which have reactive groups, and 0.05 to equimolar amounts, based on the reactive groups, of pentaerythritol triacrylate or pentaerythritol trimethacrylate. For accomplishing the purpose of the present invention, however, the reaction must be carried out with at least equimolar amounts of these reactants. The reaction in the molar ratio of 1 mole of SiCl: 1 mole of pentaerythritol triacrylate or pentaerythritol trimethacrylate to 1:1.1 is preferred. Care should be taken that, in the product from the process, all of the SiCl groups have reacted with the pentaerythritol triacrylate or the pentaerythritol trimethacrylate. A small excess of unreacted pentaerythritol triacrylate or pentaerythritol trimethacrylate does not eliminate the abhesive properties of the products of the process.

It is a significant characteristic of the process of the present invention that the product is essentially free from solid components suspended therein. It has surprisingly turned out that the abhesive properties are considerably reduced or even completely masked by these solid components. It is suspected but not certain, that the presence of impurities, such as, for example, pentaerythritol tetracrylate or pentaerythritol tetramethacrylate, which are contained in the pentaerythritol triacrylate or pentaerythritol trimethacrylate, cause this phenomenon.

The separation of these solid components can take place using conventional methods for the separation of solid components from liquids. The separation of the solid components is accomplished simply, and therefore preferably, by centrifuging. In principle, however, a filtration can also be carried out. In this case, however, it is recommended that a solvent be added in which the product of tie process, but not the solid components, is soluble. For this purpose, non-polar solvents, such as, for example, hexane are particularly suitable.

In the case of short-chain linear and branched polysiloxanes, it turns out that the process of the present invention proceeds particularly readily, if the organohalogen siloxanes ae not reacted directly with pentaerythritol triacrylate or pentaerythritol trimethacrylate. Rather, the siloxanes are initially reacted with at least twice the molar amount, based on the SiCl groups, of a dialkylamine. In so doing, the two alkyl groups of the dialkylamine each have three to five carbon atoms wherein the carbon atoms adjacent to the nitrogen carry, at most, one hydrogen atom each. Examples of such amines are di-isopropylamine, di-sec.-butylamine and di-2-pentylamine. Di-isopropylamine is especially preferred.

On the one hand, these secondary amines are able to react with chlorosiloxanes and to bind the HCl which is formed. On the other hand, they are not able to add to an $\alpha,\beta$-unsaturated carboxylic ester (e.g., acrylates) (Houben-Weyl, "Methoden der organischen Chemie'- '—Methods of Organic Chemistry—XI/1, published by Georg Thieme, Stuttgart 1957, pages 277–280).

If the organohalogen polysiloxane is initially reacted in this modification of the process with the dialkylamine, each SiCl group reacts with an equimolar amount of amine, forming the dialkylamine siloxanes. The hydrogen chloride, released by this reaction, is bound by the second mole of amine. By the reaction with amine, the hydrogen chloride is immediately bound in the reaction system.

The inventively produced products of the process can be used directly, as such, in coating materials. It is merely necessary, as has also already been described in German Offenlegungsschrift No. 2,747,233, to add a radical starter to the products of the process. The addition takes places in amounts of 2 to 5 weight percent, based on the modified siloxane. The radical starter is selected so as to correspond to the wavelength spectrum of the UV source of radiation used for the curing. Such radical starters are known. For example, it is possible to use benzophenone, its oxime or benzoin ethers, as well as other compounds known for this purpose.

The coating materials so obtained may be modified by the addition of further products. Such modifying agents are, for example, siloxanes with groups which are chemically incorporated in the coating material as this material is being cured. Particularly suitable modifying agents are siloxanes with hydrogen atoms attached to silicon atoms. These may bring about a lowering of the viscosity of the coating material, thus improving the ease of application onto two-dimensional carriers. The amount added depends on the effect which is desired and generally is in the range from 5 to 40 weight percent, based on the modified siloxane.

The following examples illustrate the present invention

EXAMPLE 1

The inventive process may be carried out according to the following general directions.

The chlorosiloxane is added dropwise at 70° C. to toluene (2.5 times the amount of pentaerythritol triacrylate or pentaerythritol trimethacrylate used) and di-isopropylamine, the latter being present in a 10% excess (2 moles of amine per mole of SiCl). The solution is stirred for one hour at this temperature.

Subsequently, elemental copper powder is added as an inhibitor (0.5 g of copper per mole of pentaerythritol triacrylate or pentaerythritol trimethacrylate). Pentaerythritol triacrylate or pentaerythritol trimethacrylate (1 mole per equivalent of chlorine) is added dropwise and stirring is continued for 40 minutes. The hydrochloride of the secondary amine is filtered off and the filtrate is mixed with the above amount of copper powder.

The solvent is distilled under the vacuum of a water-jet pump at a maximum pot temperature of 80° C. Finally the product is filtered under pressure through a filter press.

Formulation a

Chlorosiloxane with n=6.4 (n=number of silicon atoms in the average molecule)

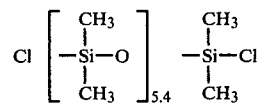

Quantities:
1027.0 g toluene
200.4 g di-isopropylamine
238.3 g chlorosiloxane, n=6.4
0.5 g copper powder
410.6 g pentaerythritol triacrylate (OH number=123)
Yield: 446.4 g Solids are suspended in the product. They are removed in the following manner. The product is taken up in the three-fold volume of n-hexane. After 24 hours of standing, a deposit has formed and can be separated and discarded. The liquid phase is centrifuged for 2 hours at 4500 rpm and subsequently decanted from the deposit. After distilling off the solvent under vacuum, the purified final product is obtained.

Formulation b

Chlorosiloxane with n=16.0

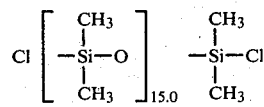

Quantities:
912.0 g toluene
178.1 g di-isopropylamine
496.6 g chlorosiloxane, n=16.0
0.4 g copper powder
364.9 g pentaerythritol triacrylate (OH number=123)
Yield: 678.6 g

Formulation c

Branched chlorosiloxane

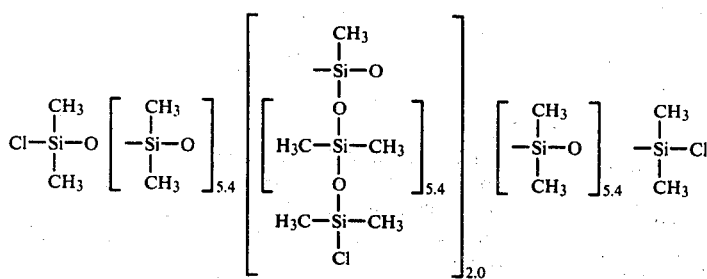

Quantities:
- 738.0 g toluene
- 133.6 g di-isopropylamine
- 321.3 g branched chlorosiloxane
- 0.3 g copper powder
- 295.3 g pentaerythritol triacrylate (OH number = 114)

Yield: 440.7 g

Formulation d

Chlorosiloxane with n = 73.4

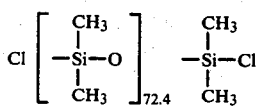

Quantities:
- 492.0 g toluene
- 89.0 g di-isopropylamine
- 1099.6 g chlorosiloxane
- 0.2 g copper powder
- 196.9 g pentaerythritol triacrylate (OH number = 114)

Yield: 1108.3 g

Formulation e

Chlorosiloxane with n = 261.1

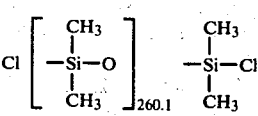

Quantities:
- 591.0 g toluene
- 26.7 g di-isopropylamine
- 1165.0 g chlorosiloxane
- 0.1 g copper powder
- 59.1 g pentaerythritol triacrylate (OH number = 114)

Yield: 1112.7 g

Formulation f

Chlorosiloxane with n = 16.0

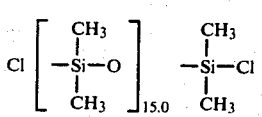

Quantities:
- 1063.0 g toluene
- 222.6 g di-isopropylamine
- 620.7 g chlorosiloxane
- 0.5 g copper powder
- 425.1 g pentaerythritol trimethacrylate (OH number = 132)

EXAMPLE 2

Reaction of a linear chlorosiloxane, n = 16.0

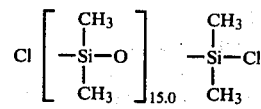

with pentaerythritol triacrylate without the aminosiloxane intermediate stage

Absolute toluene, pentaerythritol triacrylate, triethylamine and copper powder are added to the reactor. The chlorosiloxane is added dropwise at room temperature during a period of about 10 minutes. Stirring is subsequently continued for a further 30 minutes. Ethanol is added and the mixture is stirred for an additional 60 minutes. The precipitated triethylamine hydrochloride is filtered off with vacuum, copper powder is added and the solvent is distilled off under the vacuum of a water-jet pump to a pot temperature of 80° C. Finally, the product is filtered under pressure through a filter press.

Quantities:
- 685.0 g toluene
- 273.7 g pentaerythritol triacrylate (OH number = 123)
- 66.8 g triethylamine
- 0.3 g copper powder
- 372.4 g linear chlorosiloxane
- 23.1 g ethanol Yield: 498.3 g Preparation of an Abhesive Coating Material and Application thereof The reaction product (8.5 g) from Example 1, Formulation b, is mixed with 1.5 g of a methylhydrogen siloxane of the following structure

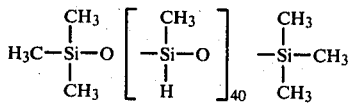

Subsequently, 0.3 g of finely powdered benzophenone are added and the mixture is heated to 50° C., until the initiator has dissolved. The mixture is ready for use immediately after the initiator has dissolved.

The film is applied with a 1μ doctor blade and is then cured with a mercury vapor, medium pressure lamp, with an output of about 80 watts per centimeter of lamp length. The irradiation times, which lead to completely cured coatings, vary from about 1 to 6 seconds, depending on the amount of initiator used and on the chain length of the modified polysiloxane.

The measurement of the abhesivity of the UV systems, which have been applied on paper and cured, is carried out as follows.

A 30 mm wide adhesive tape is rolled onto the coated paper at room temperature and subsequently kept under a load of $1.962 \times 10^3$ N/m² for 20 hours. After this time, the weight is removed and the force required to pull the adhesive tape from the substrate at a peeling angle of 180° and a speed of $10^{-2}$ m/sec is measured. This force is called the separation value. The strip of adhesive tape, which has been pulled off, is glued onto a clean, degreased glass plate and once again kept under a load of $1.962 \times 10^3$ N/m² at room temperature for 20 hours. The force required to pull off the adhesive strip after this time is related to a blank value for an adhesive strip on glass and the residual adhesive force is calculated as a percentage. In order to clarify the adhesive force of the adhesive tape, the forces which must be used after the above loading (20 hours at $1.962 \times 10^3$ N/m²) in order to pull the adhesive tape from the uncoated paper as well as from the degreased glass plate (blank value) are given.

|  | Separation Value |
| --- | --- |
| Uncoated paper | 7.6 N |
| Degreased glass plate | 12.0 N |

The following table gives the separation value and the residual adhesive forces of the systems described in the examples.

| Number of Si-atoms in the average molecule | Separation value (N) | Residual adhesive force (%) | Formulation No. |
| --- | --- | --- | --- |
| 6.4 | 0 | 63 | a |
| 16.0 | 0 | 78 | b |
| branched product | $1.47 \cdot 10^{-1}$ | 88 | c |
| 73.4 | $1.47 \cdot 10^{-1}$ | 93 | d |
| 261.1 | $1.47 \cdot 10^{-1}$ | 78 | e |
| 16.0 | 0 | 74 | f |

What is claimed is:

1. In a method for the manufacture of organopolysiloxanes suitable for use as active ingredients in abhesive coating materials for two-dimensional carriers wherein an organopolysiloxane having SiCl groups is reacted with pentaerythritol triacrylate or pentaerythritol trimethacrylate, whereby:
(a) said organopolysiloxane having the formula

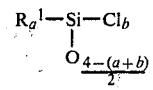

in which
R¹ is selected from the group consisting of alkyl with 1 to 4 carbon atoms, a vinyl group, a phenyl group, and combinations thereof, with the proviso that at least 90 mole percent of the R¹ groups are methyl groups,
a has a value of 1.8 to 2.2, and
b a value of 0.004 to 0.5;
(b) the reaction being carried out with at least equimolar amounts of pentaerythritol triacrylate or pentaerythritol trimethacrylate based on the amount of the polysiloxane; and
(c) the product from the process being separated from the solid components suspended therein, the improvement which comprises: the organochlorosiloxane is initially reacted with at least 2 molar amounts per SiCl group of a dialkylamine whose alkyl groups in each case have 3 to 5 carbon atoms and in which each of the carbon atoms adjacent to the nitrogen carry at most one hydrogen atom and wherein the product of this initial reaction is reacted with pentaerythritol triacrylate or pentaerythritol trimethacrylate.

2. The method of claim 1 wherein HCl-binding neutralizing agents are added to the reaction mixture.

3. The method of claim 1 wherein the organochlorosiloxane is initially reacted with di-isopropylamine.

4. The method of claim 1, 2, or 3, wherein α,ω-bis-chloropolydimethyl siloxane with 6 to 50 dimethylsiloxy units is used as the organohalogen siloxane.

5. The method of claim 1, 2, or 3, wherein the solid components are removed from the reaction product by centrifuging.

6. The method of claim 1, 2, or 3, wherein R¹ is selected from the group consisting of methyl and ethyl.

7. The method of claim 1, 2, or 3, wherein R¹ is methyl.

8. The method of claim 1, 2, or 3 wherein R¹ is 10 mole percent phenyl and 90 mole percent methyl.

9. A UV curable abhesive coating composition containing an abhesive effective amount of the product obtained from the method of claim 1, 2, or 3.

10. A two-dimensional carrier having thereon a coating composition containing an abhesive effective amount of the UV cured product obtained from the method of claim 1, 2, or 3.

* * * * *